(12) United States Patent
Jo et al.

(10) Patent No.: US 12,404,173 B2
(45) Date of Patent: Sep. 2, 2025

(54) SOLID ELECTROLYTE, AND METHOD FOR PRODUCING SAME

(71) Applicant: LG ENERGY SOLUTION, LTD., Seoul (KR)

(72) Inventors: Vin-Na Jo, Daejeon (KR); Hyea-Eun Han, Daejeon (KR); Je-Yne Lyoo, Daegu (KR); Seung-Tae Hong, Daegu (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 722 days.

(21) Appl. No.: 17/636,312

(22) PCT Filed: Mar. 18, 2021

(86) PCT No.: PCT/KR2021/003387
§ 371 (c)(1),
(2) Date: Feb. 17, 2022

(87) PCT Pub. No.: WO2021/201471
PCT Pub. Date: Oct. 7, 2021

(65) Prior Publication Data
US 2022/0289569 A1 Sep. 15, 2022

(30) Foreign Application Priority Data
Apr. 1, 2020 (KR) .................. 10-2020-0039967

(51) Int. Cl.
*H01M 10/052* (2010.01)
*C01B 17/40* (2006.01)
(Continued)

(52) U.S. Cl.
CPC .......... *C01B 17/40* (2013.01); *H01M 10/052* (2013.01); *H01M 10/0562* (2013.01);
(Continued)

(58) Field of Classification Search
CPC ...... C01B 17/40; C01B 25/14; H01M 10/052; H01M 10/0562; H01M 2300/0068;
(Continued)

(56) References Cited

U.S. PATENT DOCUMENTS 8,697,292 B2 * 4/2014 Kanno .................... H01B 1/10
429/321
2013/0040208 A1 2/2013 Kanno et al.
(Continued)

FOREIGN PATENT DOCUMENTS

CN 1937301 A 3/2007
CN 108258303 A 7/2018
(Continued)

OTHER PUBLICATIONS

Dietrich et al. "Local structural investigation, defect formation, and ionic conductivity of the lithium-ion conductor Li4P2S6" (Year: 2016).*
(Continued)

*Primary Examiner* — Matthew T Martin
*Assistant Examiner* — Felicity B Alban
(74) *Attorney, Agent, or Firm* — Birch, Stewart, Kolasch & Birch, LLP (57) ABSTRACT

The present disclosure relates to a novel material used as a solid electrolyte for an all-solid-state battery. Particularly, the present disclosure relates to a sulfide-based solid electrolyte including lithium, sulfur, phosphorus and zinc elements, and a method for preparing the same.

13 Claims, 5 Drawing Sheets

(51) Int. Cl.
*C01B 25/14* (2006.01)
*H01B 1/10* (2006.01)
*H01M 10/0562* (2010.01)

(52) U.S. Cl.
CPC ...... *C01P 2002/74* (2013.01); *C01P 2002/76* (2013.01); *C01P 2002/77* (2013.01); *C01P 2006/40* (2013.01); *H01M 2300/0068* (2013.01); *H01M 2300/0091* (2013.01)

(58) Field of Classification Search
CPC ........ H01M 2300/0091; C01P 2002/74; C01P 2002/76; C01P 2002/77; C01P 2006/40; C01P 2002/72; C01P 2004/61; Y02E 60/10; H01B 1/10
See application file for complete search history.

(56) References Cited

U.S. PATENT DOCUMENTS

| | | | |
|---|---|---|---|
| 2015/0118574 | A1 | 4/2015 | Visbal et al. |
| 2016/0156064 | A1 | 6/2016 | Miyashita et al. |
| 2018/0076452 | A1 | 3/2018 | Sasaki et al. |
| 2019/0051932 | A1 | 2/2019 | Kim et al. |
| 2020/0052330 | A1 | 2/2020 | Choi et al. |
| 2020/0358132 | A1* | 11/2020 | Yamada .................. H01B 1/10 |

FOREIGN PATENT DOCUMENTS

| | | | |
|---|---|---|---|
| JP | 2017-117635 | A | 6/2017 |
| KR | 10-2012-0136372 | A | 12/2012 |
| KR | 10-2015-0050321 | A | 5/2015 |
| KR | 10-2015-0132265 | A | 11/2015 |
| KR | 10-2017-0024862 | A | 3/2017 |
| KR | 10-1939568 | B1 | 1/2019 |
| KR | 10-2020-0018132 | A | 2/2020 |
| WO | WO2017/047015 | A1 | 3/2017 |

OTHER PUBLICATIONS

Extended European Search Report for corresponding European Application No. 21780715.5, dated Dec. 12, 2022.
Hogg, "Issues in Particle Size Analysis," KONA Powder and Particle Journal, No. 26, Jan. 1, 2008, pp. 81-93.
Suzuki et al., "Synthesis and Electrochemical Properties of /4-Type $Li_{1+2x}Zn_{1-x}PS_4$ Solid Electrolyte", Chemistry of Materials, vol. 30, 2018, pp. 2236-2244.
Holzwarth et al., "Computer modeling of lithium phosphate and thiophosphate electrolyte materials", Journal of Power Sources, 196, (2011), pp. 6870-6876.
International Search Report for PCT/KR2021/003387 (PCT/ISA/210) mailed on Jun. 23, 2021.
Kaup et al., "Correlation of Structure and Fast Ion Conductivity in the Solid Solution Series $Li_{1+2}xZn_{1-x}PS_4$", Chemistry of Materials, 2018, 30, pp. 592-596.
Kudu et al., "A review of structural properties and synthesis methods of solid electrolyte materials in the $Li_2S-P_2S_5$ binary system", Journal of Power Sources, 407, (2018), pp. 31-43.
Stamminger et al., "Fast diffusion mechanism in $Li_4P_2S_6$ via a concerted process of interstitial Li ions", Royal Society of Chemistry Advances, 2020, 10, pp. 10715-10722.
Takada et al., "Lithium iron thio-phosphate: a new 3 V sulfide cathode", Solid State Ionics, 159, (2003), pp. 257-263.

* cited by examiner

SOLID ELECTROLYTE, AND METHOD FOR PRODUCING SAME

TECHNICAL FIELD

The present disclosure relates to a solid electrolyte and a method for preparing the same. Particularly, the present disclosure relates to a sulfide-based solid electrolyte.

The present application claims priority to Korean Patent Application No. 10-2020-0039967 filed on Apr. 1, 2020 in the Republic of Korea, the disclosures of which are incorporated herein by reference.

BACKGROUND ART

Importance of lithium secondary batteries has been increased, as the use of vehicles, computers and portable terminals has been increased. Particularly, there is a need for developing lithium secondary batteries having a low weight and capable of providing high energy density. Such lithium secondary batteries may be provided as lithium-ion batteries by interposing a separator between a positive electrode and a negative electrode and injecting a liquid electrolyte thereto, or as all-solid-state batteries by interposing a solid electrolyte membrane between a positive electrode and a negative electrode.

Among such lithium secondary batteries, lithium-ion batteries using a liquid electrolyte have a structure including a negative electrode and a positive electrode divided by a separator. Therefore, when the separator is damaged by deformation or external impact, a short-circuit may occur, resulting in risks, such as overheating or explosion.

On the contrary, all-solid-state batteries using a solid electrolyte show enhanced battery safety and can prevent electrolyte leakage, and thus provide improved battery reliability.

The present disclosure relates to a solid electrolyte having a novel crystal structure. More particularly, the present disclosure relates to a sulfide-based solid electrolyte having a channel facilitating ion conduction by virtue of crystallographic specificity derived from the ordering of metal ion sites and metal ion defects in a unit cell, and an electrochemical device including the same.

Figure 1:
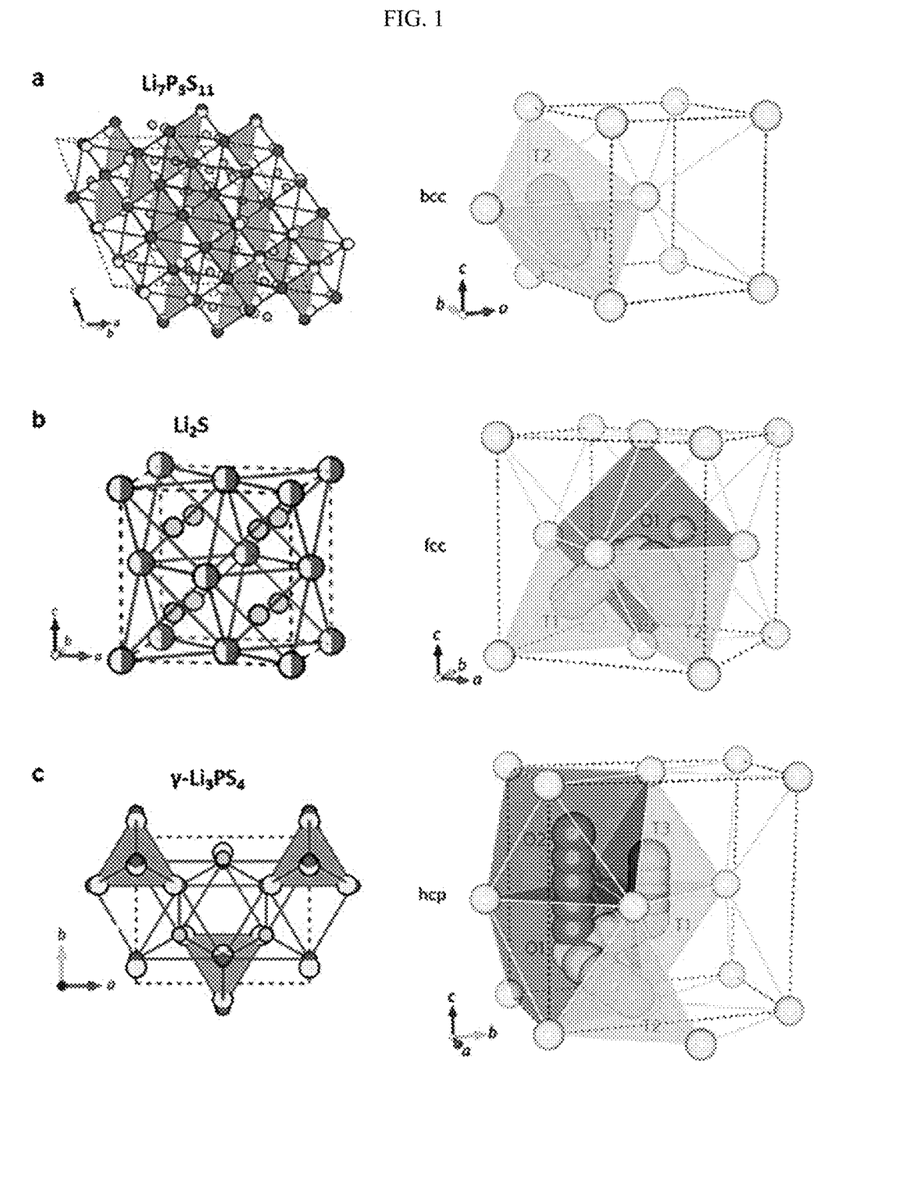
FIG. 1 is a schematic view illustrating the crystal structure of a typical solid electrolyte.
Figure 2:
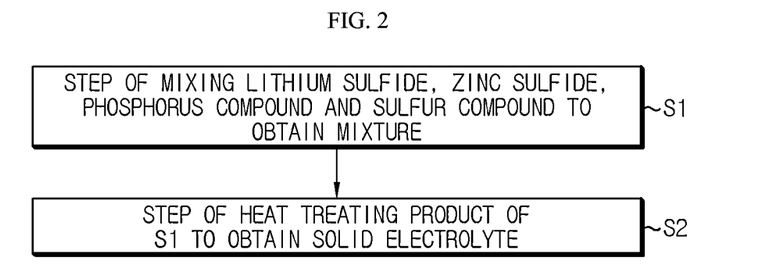
FIG. 2 is a flow chart illustrating the method for preparing a sulfide-based solid electrolyte according to an embodiment of the present disclosure.

Solid electrolytes may be classified depending on crystal structures, as shown in FIG. 1 (P. Lian, B. Zhao, L. Zhang, N. Xu, M. Wu and X. Gao, J. Mater. Chem. A, 2019).

Although all of the materials in FIG. 1 have a potential as solid electrolytes, each of them has an advantage and disadvantage depending on the applications using them. It is thought that this is because different ion conductivities and physicochemical properties are provided as a function of temperature depending on the unique properties of the materials, such as the crystal structure or ion defect structure of each material.

The solid electrolytes used for such all-solid-state batteries may be classified broadly into oxide-based solid electrolytes and sulfide-based solid electrolytes. Particularly, sulfide-based solid electrolytes show high ion conductivity as compared to oxide-based solid electrolytes. Among such sulfide-based solid electrolytes, Li—P—S type solid electrolytes are representative next-generation materials having high ion conductivity.

DISCLOSURE

Technical Problem

Such Li—P—S type sulfide-based solid electrolytes include non-crystalline $Li_2S$—$P_2S_5$ type glass ceramics or crystalline Li—Ge—P—S (LGPS) type solid electrolytes. Particularly, the $Li_2S$—$P_2S_5$ type glass ceramics show increased lithium-ion conductivity by adding a halogenated compound thereto, but are disadvantageous in that they have a difficulty in handling due to the presence of a halogen compound. In addition, the LGPS type compounds have disadvantages in terms of cost-efficiency and commercialization due to the high cost of germanium (Ge).

Under these circumstances, the present disclosure is directed to providing a novel sulfide-based solid electrolyte which is free from a halogenic element or germanium and has excellent electrochemical stability.

The present disclosure is also directed to providing a novel sulfide-based solid electrolyte prepared by mixing a zinc element, and having a novel crystal structure that has not been known to date and lithium-ion conductivity derived from such a novel crystal structure.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a novel sulfide-based solid electrolyte according to any one of the following embodiments.

According to the first embodiment, there is provided a sulfide-based solid electrolyte having a novel crystal structure satisfying the following conditions (a)-(c):

(a) a space group that belongs to P$\bar{3}$1m (No. 162);

(b) unit cell parameters of a=6.03±0.5 Å and c=6.59±0.5 Å; and (c) crystallographic coordinates of cations occupying 2c, 2d and 2e coordinates in a unit cell with a site occupancy of each coordinate of larger than 0 and equal to or less than 1, and a crystallographic coordinate of anions occupying 6k coordinate in a unit cell with a site occupancy of 6k of larger than 0 and equal to or less than 1, wherein each of the coordinates represents the following:

2c (⅓, ⅔, 0);

2d (⅓, ⅔, ½);

2e (0, 0, z), wherein 0.30≤z≤0.33; and 6k (x, 0, z), wherein 0.325≤x≤0.35 and 0.23≤z≤0.28.

According to the second embodiment, there is provided the sulfide-based solid electrolyte as defined in the first embodiment, which includes a lithium element (Li); a phosphorus element (P); six sulfur elements (S); and a zinc element (Zn).

According to the third embodiment, there is provided the sulfide-based solid electrolyte as defined in the first or the second embodiment, which includes a compound represented by the following Chemical Formula 1:

$Li_xZn_yP_zS_6$      [Chemical Formula 1]

wherein 1≤x≤4, 0<y≤2, and 0<z≤3.

According to the fourth embodiment, there is provided the sulfide-based solid electrolyte as defined in any one of the first to the third embodiments, which includes a compound represented by the following Chemical Formula 2:

$Li_{2+2k}Zn_{1-k}P_2S_6$      [Chemical Formula 1]

wherein 0≤k<1.

According to the fifth embodiment, there is provided the sulfide-based solid electrolyte as defined in any one of the first to the fourth embodiments, which shows peaks at the following positions, as analyzed by powder X-ray diffractometry (XRD) using Cu-Kα rays with an X-ray wavelength of 1.5406 Å and 1.5444 Å:

$2\theta=12\text{-}14°$;
$2\theta=16\text{-}18°$;
$2\theta=25\text{-}26°$;
$2\theta=30\text{-}33°$;
$2\theta=39\text{-}41°$; and
$2\theta=50\text{-}53°$ According to the sixth embodiment, there is provided the sulfide-based solid electrolyte as defined in any one of the first to the fifth embodiments, which has the same crystal structure as $Li_4P_2S_6$.

According to the seventh embodiment, there is provided the sulfide-based solid electrolyte as defined in any one of the first to the sixth embodiments, which has an average particle diameter ($D_{50}$) of 1-20 μm.

According to the eighth embodiment, there is provided the sulfide-based solid electrolyte as defined in the second embodiment, wherein k is 0-0.75, and the sulfide-based solid electrolyte has an ion conductivity of $1\times10^{-6}$ to $15\times10^{-6}$ S/cm.

In another aspect of the present disclosure, there is provided a method for preparing a sulfide-based solid electrolyte according to any one of the following embodiments.

According to the ninth embodiment, there is provided a method for preparing a sulfide-based solid electrolyte including the steps of:

(S1) mixing lithium sulfide ($Li_2S$), zinc sulfide (ZnS), a phosphorus (P) compound and a sulfur (S) compound to obtain a mixture; and (S2) heat treating the mixture to obtain a crystalline or vitreous solid electrolyte.

According to the tenth embodiment, there is provided the method for preparing a sulfide-based solid electrolyte as defined in the ninth embodiment, wherein lithium sulfide and zinc sulfide are used at a molar ratio of 2+2k:1−k (wherein 0≤k<1).

According to the eleventh embodiment, there is provided the method for preparing a sulfide-based solid electrolyte as defined in the tenth embodiment, wherein k is 0-0.75, and the sulfide-based solid electrolyte has an ion conductivity of $1\times10^{-6}$ to $15\times10^{-6}$ S/cm.

According to the twelfth embodiment, there is provided the method for preparing a sulfide-based solid electrolyte as defined in any one of the ninth to the eleventh embodiments, which further includes a step of pelletizing the mixture between step (S1) and step (S2).

According to the thirteenth embodiment, there is provided the method for preparing a sulfide-based solid electrolyte as defined in any one of the ninth to the twelfth embodiments, which is carried out under vacuum or under inert gas atmosphere.

In still another aspect of the present disclosure, there is provided an all-solid-state battery according to the following embodiment.

According to the fourteenth embodiment, there is provided an all-solid-state battery including: a positive electrode; a negative electrode; and an electrolyte layer interposed between the positive electrode and the negative electrode, wherein at least one of the positive electrode, the negative electrode and the electrolyte layer includes the sulfide-based solid electrolyte as defined in any one of the above-described embodiments.

Advantageous Effects

According to an embodiment of the present disclosure, it is possible to provide a sulfide-based solid electrolyte which is free from a halogenic element or germanium and has a crystal structure within a compositional range not known to date. It is possible to provide a sulfide-based solid electrolyte having excellent electrochemical stability by virtue of such a crystal structure. Particularly, since the sulfide-based solid electrolyte according to an embodiment of the present disclosure has the above-mentioned crystal structure, it can maintain a stable state, even when lithium intercalation/deintercalation cycles are repeated, as compared to the solid electrolytes according to the related art.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes or comprises an element' does not preclude the presence of any additional elements but means that the part may further include the other elements, unless otherwise stated.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a sulfide-based solid electrolyte and a method for preparing the same.

Typical Li—P—S type sulfide-based solid electrolytes include non-crystalline $Li_2S$—$P_2S_5$ type glass ceramics or crystalline Li—Ge—P—S (LGPS) type solid electrolytes. Particularly, the $Li_2S$—$P_2S_5$ type glass ceramics show increased lithium-ion conductivity by adding a halogenated compound thereto, but are disadvantageous in that they have a difficulty in handling due to the presence of a halogen compound. In addition, the LGPS type compounds have disadvantages in terms of cost-efficiency and commercialization due to the high cost of germanium (Ge).

Therefore, the present disclosure is directed to providing a novel sulfide-based solid electrolyte which is free from a halogenic element or germanium and has excellent electrochemical stability.

In one aspect of the present disclosure, there is provided a sulfide-based solid electrolyte having a novel crystal structure satisfying the following conditions (a)-(c).

Herein, the novel crystal structure satisfies: (a) a space group that belongs to P$\bar{3}$1m (No. 162); (b) unit cell parameters of a=6.03±0.5 Å and c=6.59±0.5 Å; and (c) crystallographic coordinates of cations occupying 2c, 2d and 2e coordinates in a unit cell with a site occupancy of each coordinate of larger than 0 and equal to or less than 1, and a crystallographic coordinate of anions occupying 6k coordinate in a unit cell with a site occupancy of 6k of larger than 0 and equal to or less than 1. In addition, each of the coordinates represents the following: 2c (⅓, ⅔, 0); 2d (⅓, ⅔, ½); 2e (0, 0, z), wherein 0.30≤z≤0.33; and 6k (x, 0, z), wherein 0.325≤x≤0.35 and 0.23≤z≤0.28.

Hereinafter, the present disclosure will be explained in more detail.

In one aspect of the present disclosure, there is provided a sulfide-based solid electrolyte having a novel crystal structure not known to date.

The sulfide-based solid electrolyte according to an embodiment of the present disclosure has the above-described crystal structure to allow reversible lithium-ion intercalation/deintercalation, and is structurally stable by virtue of a three-dimensional ion diffusion channel. In addition, the solid electrolyte can provide a solid electrolyte battery including the same with improved durability by virtue of the structural stability.

As used herein, 'space group' refers to the symmetricity of a crystal structure defined mathematically and is known to those skilled in the art.

To obtain such a sulfide-based solid electrolyte having a novel crystal structure, the present inventors have focused on the fact that substitution of a lithium element with a zinc element reduces lithium content.

Therefore, the sulfide-based solid electrolyte having a novel crystal structure according to an embodiment of the present disclosure may include: a lithium element (Li); a phosphorus element (P); six sulfur elements (S); and a zinc element (Zn).

Particularly, the sulfide-based solid electrolyte may be represented by the following Chemical Formula 1 and may have a crystalline or vitreous structure:

$$Li_xZn_yP_zS_6 \qquad \text{[Chemical Formula 1]}$$

wherein 1≤x≤4, 0<y≤2, and 0<z≤3.

In Chemical Formula 1, x may be particularly 1-4 or 2.5-3.5, and more particularly, 2-3. For example, x may be 2.5.

In Chemical Formula 1, y is larger than 0 and equal to or less than 2. In other words, in Chemical Formula 1, zinc (Zn) is an essential element. Since the sulfide-based solid electrolyte includes a zinc element as mentioned above, it is possible to provide a sulfide-based solid electrolyte having high electrochemical stability and high lithium-ion conductivity. It is thought that this is because the binding between a zinc element and a sulfur element is strong and stable. Particularly, a zinc element has a small ion radius to form a rigid bond with a sulfur (S) element, and thus is hardly decomposed by reduction in nature. Therefore, it is thought that zinc shows a low reduction potential.

According to an embodiment of the present disclosure, y may be larger than 0 and equal to or less than 2, larger than 0 and equal to or less than 1.5, or larger than 0 and equal to or less than 1. For example, y may be 0.5-1. When y is 0, zinc cannot exist so that the crystal structure of the solid electrolyte according to an embodiment of the present disclosure may not be obtained. When y is larger than 2, there is a problem in that the solid electrolyte according to the present disclosure shows poor purity or yield in proportion to the amount of impurities in the starting material, zinc sulfide.

In Chemical Formula 1, z may be particularly larger than 0 and equal to or less than 3, larger than 0 and equal to or less than 2.5, or larger than 0 and equal to or less than 2. For example, z may be 2. When z is 0, each of lithium sulfide ($Li_2S$) and zinc sulfide merely exist as each phase and the solid electrolyte according to the present disclosure is not synthesized. When z is larger than 3, there is a problem in that Li—P—S is synthesized as a main product.

The sulfide-based solid electrolyte having the above crystal structure may have a crystalline or vitreous structure represented by the following Chemical Formula 2 depending on the relationship between lithium and zinc elements:

$$Li_{2+2k}Zn_{1-k}P_2S_6 \qquad \text{[Chemical Formula 2]}$$

wherein 0≤k<1.

In Chemical Formula 2, k may be particularly 0-1 or 0.1-0.8, more particularly 0.2-0.6. For example, k may be 0.25.

According to an embodiment of the present disclosure, the sulfide-based solid electrolyte includes lithium sulfide (Li$_2$S) and zinc sulfide (ZnS) at a molar ratio of 2+2k:1-k (wherein 0≤k<1).

The sulfide-based solid electrolyte represented by Chemical Formula 1 or 2 may have a molar ratio of Li/Zn of smaller than 20 and equal to or larger than 2. Particularly, the molar ratio of Li/Zn may be 6.

The sulfide-based solid electrolyte may have a space group of P$\bar{3}$1m (No. 162). Herein, the unit cell parameters may be a=6.03±0.5 Å and c=6.59±0.5 Å.

The sulfide-based solid electrolyte may show XRD peaks at 2θ=12-14°; 2θ=16-18°; 2θ=25-26°; 2θ=30-33°; 2θ=39-41°; and 2θ=50-53°, as analyzed by powder X-ray diffractometry (XRD) using Cu-Kα rays with an X-ray wavelength of 1.5406 Å and 1.5444 Å.

Figure 3:
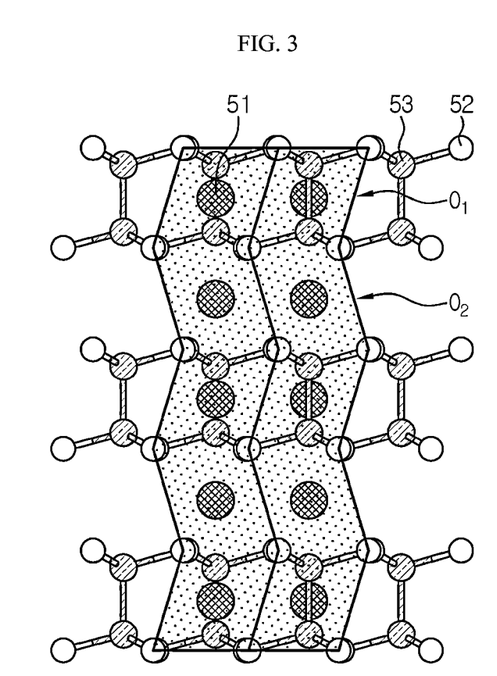
FIG. 3 is a schematic view illustrating the crystal structure of $Li_4P_2S_6$.

According to an embodiment of the present disclosure, the sulfide-based solid electrolyte may have the Li$_4$P$_2$S$_6$ crystal structure. Herein, the Li$_4$P$_2$S$_6$ crystal structure may be the same as shown in FIG. 3. Referring to FIG. 3, the crystal structure has a structural unit having an octahedron O$_1$ including lithium 51, sulfur 52 and phosphorus 53 elements and an octahedron O$_2$ including lithium 51 and sulfur 52 elements. Herein, an edge is shared between O$_1$ and O$_1$, and a side is shared between O$_1$ and O$_2$.

The sulfide-based solid electrolyte according to an embodiment of the present disclosure has the same crystal structure as the L$_4$P$_2$S$_6$ crystal structure. However, it can be seen that the solid-electrolyte according to an embodiment of the present disclosure shows significantly different crystallographic coordinates in the unit cell as described hereinafter, and thus it is a novel compound.

Figure 4:
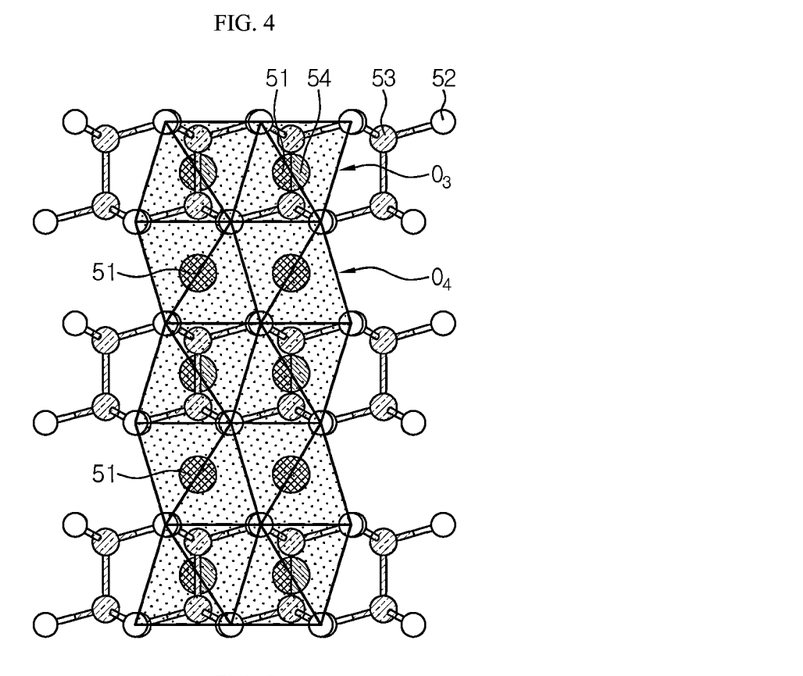
FIG. 4 is a schematic view illustrating the crystal structure of the sulfide-based solid electrolyte according to an embodiment of the present disclosure.

FIG. 4 shows the crystal structure of the sulfide-based solid electrolyte according to an embodiment of the present disclosure.

Referring to FIG. 4, the sulfide-based solid electrolyte according to an embodiment of the present disclosure has a structural unit having an octahedron O$_3$ including co-existing lithium 51 and zinc 54 elements and also including phosphorus 53 and sulfur 52 elements, and an octahedron O$_4$ including lithium 51 and sulfur 52 elements, as well as a structural unit including phosphorus 53 and sulfur 52 elements. Herein, an edge is shared between O$_3$ and O$_3$, and a side is shared between O$_3$ and O$_4$. Meanwhile, lithium 51 and zinc 54 elements co-exist in the octahedron O$_3$.

The sulfide-based solid electrolyte may have an average particle size of 1-20 μm.

The sulfide-based solid electrolyte may have an ion conductivity of 1×10$^{-6}$ to 15×10$^{-6}$ S/cm.

Hereinafter, the method for preparing a sulfide-based solid electrolyte according to an embodiment of the present disclosure will be explained.

First, raw materials of a solid electrolyte are mixed to prepare a sulfide-based amorphous solid electrolyte (S1). Particularly, the solid electrolyte refers to an amorphous, not crystalline or vitreous, solid electrolyte prepared by mixing lithium sulfide (Li$_2$S), zinc sulfide (ZnS), a phosphorus (P) compound and a sulfur (S) compound. Herein, the molar ratio of lithium sulfide to zinc sulfide may be 2+2k:1-k (wherein 0≤k<1).

According to the present disclosure, the raw material composition includes lithium, phosphorus, zinc and sulfur elements. Herein, lithium sulfide, particularly Li$_2$S, may be used as a lithium element-containing compound.

For example, phosphorus sulfide or phosphorus oxide, particularly P$_2$S$_6$, may be used as a phosphorus element-containing compound. Particularly, phosphorus oxide may be P$_2$O$_5$.

The compound containing a sulfur element is not particularly limited. For example, the compound may be a sulfur element itself.

The prepared lithium sulfide, zinc sulfide, phosphorus compound and sulfur compound may be mixed homogeneously through mechanical milling to obtain a sulfide-based amorphous solid electrolyte. In the case of ball milling, zirconia balls having a particle size of 1-10 mm may be used for mixing. Such mechanical milling through mixing may be performed with a pause time for 5-40 hours so that the mixture may not reach a temperature causing an increase in crystallization degree, and may provide a sulfide-based amorphous solid electrolyte having an average particle size of 1-20 μm. In the case of simple milling, it is difficult to obtain a particle size of less than 1μμm, and if such a particle size is obtained, a large milling time is required undesirably. When the particle size is larger than 20 μm, there may be a problem in that it is difficult to perform lithium intercalation/deintercalation. When the milling time is 5-40 hours, homogeneous mixing may be accomplished to provide an amorphous solid electrolyte having a uniform composition.

Then, a step of pelletizing the amorphous solid electrolyte by pressurizing it under a pressure of 1 ton or more may be further carried out. When such a pelletizing step is further carried out, staining with the powder-type amorphous solid electrolyte may not occur during the manufacturing process, thereby providing the solid electrolyte with high yield.

Herein, lithium sulfide and zinc sulfide may be mixed at a molar ratio of 2+2k:1−k (wherein 0≤k<1). Within the above-defined range, it is possible to obtained a sulfide-based solid electrolyte having a desired crystal structure.

Herein, when k is controlled to 0-0.75, it is possible to obtain a sulfide-based solid electrolyte having an ion conductivity of 1×10$^{-6}$ to 15×10$^{-6}$ S/cm. In this manner, it is possible to obtain a novel sulfide-based solid electrolyte having structural stability and improved ion conductivity.

After that, the resultant product is heat treated to obtain a crystalline solid electrolyte (S2).

Herein, the amorphous solid electrolyte is converted into a solid electrolyte having a crystal phase through the heat treatment.

Herein, the heat treatment step is carried out preferably at 300-500° C. for 6-20 hours. When the temperature is 300-500° C., the final product may be obtained as a solid electrolyte having a crystal phase. If a certain level of crystal phase is not present, the solid electrolyte cannot show ion conductivity. Therefore, the heat treatment is carried out preferably at the above-defined range of temperature. In addition, within the above-defined range, a desired level of ion conductivity can be obtained. When the temperature is higher than the above-defined range, ion conductivity may be decreased. Therefore, the heat treatment temperature is 300-500° C. advantageously. If necessary, drying and heat treatment may be carried out simultaneously at 300-500° C.

Herein, a step of introducing the mixture to a reactor, followed by sealing, may be carried out preliminarily for the heat treatment.

Herein, step (S1) and step (S2) may be carried out under vacuum or under inert gas atmosphere. In this manner, it is possible to prevent a side reaction of oxidation of the resultant solid electrolyte in advance.

Meanwhile, the method may further include a step of pelletizing the mixture between step (S1) and step (S2). For example, the mixture may be pelletized or formed into powder by pressurizing it under a pressure of 1 ton or more. In this case, it is possible to improve the processability and to increase the yield.

In still another aspect of the present disclosure, there is provided an all-solid-state battery including: a positive electrode; a negative electrode; and an electrolyte layer interposed between the positive electrode and the negative electrode, wherein at least one of the positive electrode, the negative electrode and the electrolyte layer includes the above-described sulfide-based solid electrolyte.

According to the present disclosure, the negative electrode may include a current collector, and a negative electrode active material layer formed on the surface of the current collector, wherein the negative electrode active material layer may include at least one element that belongs to alkali metals, alkaline earth metals, Group 3B metals and transition metals. According to an embodiment of the present disclosure, non-limiting examples of the alkali metals include at least one metal selected from the group consisting of lithium (Li), sodium (Na), potassium (K), rubidium (Rb), cesium (Cs) and francium (Fr), preferably lithium. According to an embodiment of the present disclosure, the negative electrode may be obtained by binding and stacking the negative electrode current collector with lithium metal foil having a predetermined thickness by compression.

According to the present disclosure, the positive electrode includes a current collector and a positive electrode active material layer formed on at least one surface of the current collector, wherein the positive electrode active material layer includes a positive electrode active material, a solid electrolyte and a conductive material. In addition, according to an embodiment of the present disclosure, the positive electrode active material layer may further include a binder material. It is possible to increase the binding force between the positive electrode active material and the current collector and/or solid electrolyte layer by introducing the binder material. Independently from or in combination with this, it is possible to improve the binding force among the ingredients contained in the positive electrode active material layer.

The positive electrode active material may be any material used conventionally as a positive electrode active material for a lithium-ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-x}M_xO_2$ (wherein M is one or more of Co, Mn, Al, Cu, Fe, Mg, B or Ga, and x is 0.01-0.3), such as $LiNi_{0.8}Co_{0.1}M_{0.1}O_2$; lithium manganese composite oxides represented by the chemical formula of $LiMn_{2-x}M_xO_2$ (wherein M is Co, Ni, Fe, Cr, Zn or Ta, and x is 0.01-0.1), or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as vapor grown carbon fibers (VGCF) or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

The binder material is not particularly limited, as long as it is an ingredient which assists binding of the active material with the conductive material, and binding to the current collector. Particular examples of the binder material include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer terpolymer (EPDM), sulfonated EPDM, styrene butadiene rubber, fluororubber, various copolymers thereof, or the like. In general, the binder material may be used in an amount of 1-30 wt %, or 1-10 wt %, based on 100 wt % of electrode active material layer.

According to an embodiment of the present disclosure, the negative electrode and/or positive electrode may further include various additives in order to supplement or improve physicochemical properties. The additives are not particularly limited but may include at least one additive, such as an oxidation stabilizing additive, a reduction stabilizing additive, a flame retardant, a heat stabilizer, an anti-fogging agent, or the like, if necessary.

In addition, the current collector generally has a thickness of 3-500 μm. The current collector is not particularly limited, as long as it causes no chemical change in the corresponding battery and has high conductivity. Particular examples of the current collector may include copper, stainless steel, aluminum, nickel, titanium, baked carbon, or aluminum or stainless steel surface-treated with carbon, nickel, titanium, silver, or the like. The current collector may be selected from the above-mentioned materials suitably depending on the polarity of the electrode (positive electrode or negative electrode).

Hereinafter, the present disclosure will be described more fully with reference to Preparation Examples. However, the following Preparation Examples are for illustrative purposes only, and the scope of the present disclosure is not limited thereto.

Preparation Example 1

First, each of 0.0709 g of lithium sulfide ($Li_2S$), 0.1461 g of zinc sulfide (ZnS), 0.0956 g of phosphorus (P) and 0.1966 g of sulfur (S) was milled into the form of powder under argon (Ar) atmosphere to obtain 0.5092 g of a mixture.

The mixture was pressurized and pelletized by using a hydraulic press under a pressure of 1 ton.

Then, the resultant pellets were introduced to a glass tube, sealed under vacuum and heat treated at 400° C. for 6 hours to obtain solid electrolyte powder. The results are shown in the following Table 1 and FIGS. 1-6.

Preparation Examples 2-4

Solid electrolytes were obtained in the same manner as Preparation Example 1, except that the content of each of lithium sulfide ($Li_2S$) powder, zinc sulfide (ZnS) powder, phosphorus (P) powder and sulfur (S) powder was changed as shown in Table 1. The results are shown in the following Table 1 and FIG. 5.

TABLE 1

| | Composition of solid electrolyte | Chemical formula of solid electrolyte | Molar ratio of lithium sulfide:zinc sulfide | Lithium sulfide (g) | Zinc sulfide (g) | Solid phosphorous (P) (g) | Solid sulfur (S) (g) | Ion conductivity (S/cm) |
|---|---|---|---|---|---|---|---|---|
| Prep. Ex. 1 | $Li_{2+2k}Zn_{1-k}P_2S_6$ (k = 0) | $Li_2ZnP_2S_6$ | 1:1 | 0.0709 | 0.1461 | 0.0956 | 0.1966 | $9.0 \times 10^{-6}$ |
| Prep. Ex.2 | $Li_{2+2k}Zn_{1-k}P_2S_6$ (k = 0.25) | $Li_{2.5}Zn_{0.75}P_2S_6$ | 5:3 | 0.0922 | 0.1140 | 0.0966 | 0.1999 | $1.2 \times 10^{-5}$ |
| Prep. Ex. 3 | $Li_{2+2k}Zn_{1-k}P_2S_6$ (k = 0.5) | $Li_3Zn_{0.5}P_2S_6$ | 3:1 | 0.1153 | 0.0791 | 0.1006 | 0.2083 | $1.5 \times 10^{-6}$ |
| Prep. Ex. 4 | $Li_{2+2k}Zn_{1-k}P_2S_6$ (k = 0.75) | $Li_{3.5}Zn_{0.25}P_2S_6$ | 7:1 | 0.1404 | 0.0413 | 0.1050 | 0.2174 | cannot be determined due to low ion conductivity |

Method for Determination of Ion Conductivity

Figure 9:
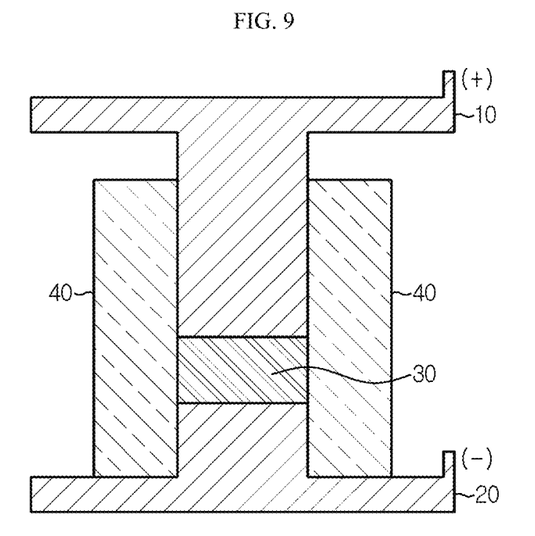
FIG. 9 is a schematic sectional view illustrating an all-solid-state battery including the solid electrolyte according to an embodiment of the present disclosure.

The solid electrolyte 30 was interposed between a positive 10 and a negative electrode 20, and the ion conductivity was calculated according to the following Formula 1 by using the alternating current impedance method. Herein, both sides of each of solid electrolytes and electrodes were fixed and pressurized with a polyetherether ketone polymer column 40.

σ=l/RA(l=length of pellets, R=resistance value, A=area of pellets)    [Formula 1]

Figure 7:
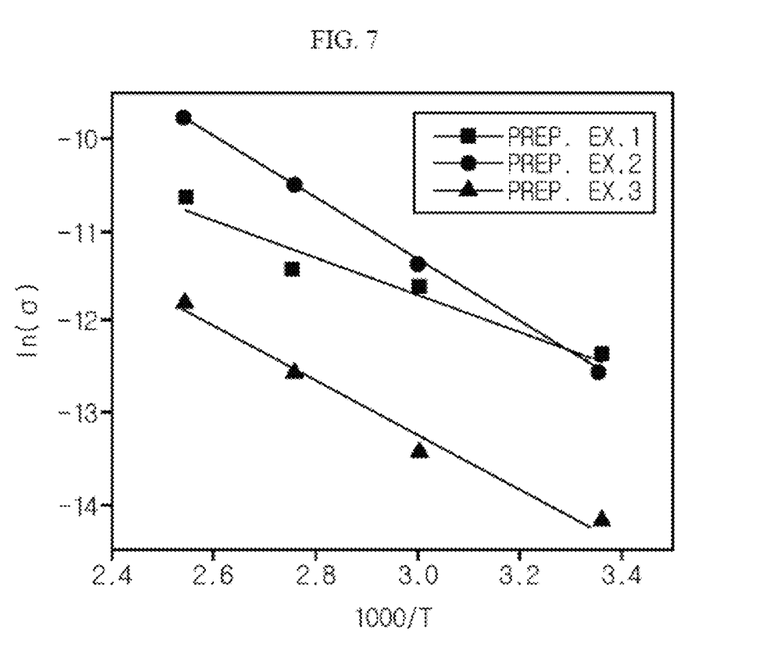
FIG. 7 is a graph illustrating the ion conductivity of each of the solid electrolytes according to Preparation Examples 1-3.

The results are shown in the Table 1 and FIG. 7.

In the case of Preparation Example 2, it shows the highest ion conductivity. It is thought that this is because Preparation Example 2 shows a high site occupancy between the adjacent lithium ions to cause a large change in diffusion path.

Analysis of Chemical Composition of Sulfide-Based Solid Electrolyte (ICP-AES)

To analyze the chemical composition of the sulfide-based solid electrolyte according to the present disclosure, inductively coupled plasma atomic emission spectroscopy (ICP-AES) was carried out. The sulfide-based solid electrolytes according to Preparation Examples 1-4 were used as samples. Each sample was pulverized, introduced to a glass vial, dissolved with concentrated nitric acid and decomposed completely with hydrogen peroxide. Each sample was diluted into three types of different volumes, and elemental analysis was carried out through the standard method by using ICP-AES (GDC Integra XMP).

After carrying out ICP elemental analysis by using the solid electrolyte according to Preparation Example 1, it can be seen that the molar ratio of lithium sulfide:zinc sulfide is 1:1 (±0.00) and hydroxyl groups are converted into $P_2S_6$, as calculated from the oxidation numbers of metals and the above ratio. Therefore, it can be seen from the result that the solid electrolyte according to Preparation Example 1 has a chemical formula of $Li_2Zn_1P_2S_6$.

Each of the solid electrolytes according to Preparation Examples 2-4 was analyzed in the same manner as described above to determine the chemical composition (see, Table 1). As a result, it can be seen that the solid electrolytes were novel materials different from those according to the related art, like the solid electrolyte according to Preparation Example 1.

Analysis of Crystal Structure Using X-Ray Diffraction Pattern (XRDP) and Neutron Diffraction Pattern As a sample for diffractometry, each of the solid electrolytes according to Preparation Examples 1-4 was used. Each sample was pulverized thoroughly and loaded to a sample holder for X-ray powder diffractometry, and Rigaku miniflex 600 XRD was used and analysis was carried out through scanning using X-ray with Cu Kα (λ=1.5406 Å and 1.5444 Å) under the application of a voltage of 40 KV and a current of 15 mA at a step of 0.02°. In addition, neutron diffractometry was carried out by using the system HANARO HRPD of Korea Atomic Energy Research Institute. Herein, 2 He-3 Multi-detector system, Ge (331) monochromator (λ=1.8361 Å) was used as neutron and scanning was performed at a step of 0.05°.

Figure 5:
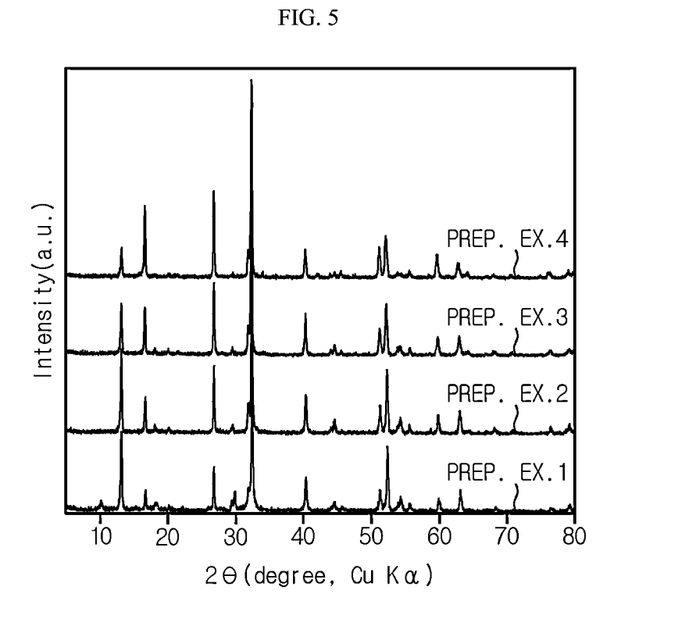
FIG. 5 is a graph illustrating the result of X-ray diffractometry (XRD) of each of the solid electrolytes according to Preparation Examples 1-4.
Figure 6:
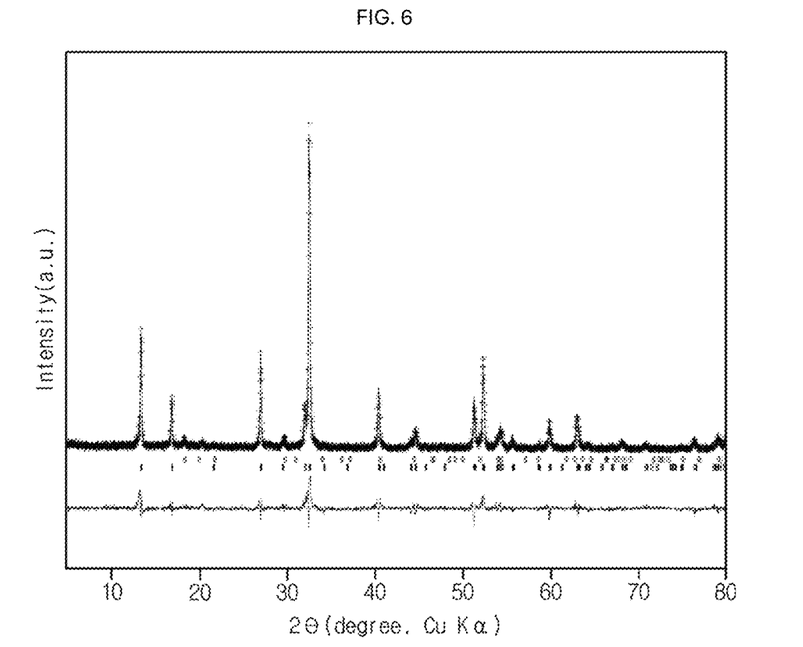
FIG. 6 is a graph illustrating the result of XRD of the solid electrolyte according to Preparation Example 2.

After examining the X-ray Diffraction Pattern (XRDP) of the solid electrolyte ($Li_2Zn_1P_2S_6$) according to Preparation Example 1, unit cell parameters are a=6.03±0.5 Å and c=6.59±0.5 Å, as determined from the peak positions. The space group was determined as P$\bar{3}$1m (No. 162) by indexing all peaks and examining the extinction rule (see, FIG. 4). The crystal structures of the other Preparation Examples were analyzed in the same manner as described above. The results are shown in FIGS. 5 and 6. As can be seen from FIGS. 5 and 6, all of the solid electrolyte according to an embodiment of the present disclosure show peaks at the following positions: 2θ=12-14°; 2θ=16-18°; 2θ=25-26°; 2θ=30-33°; 2θ=39-41°; and 2θ=50-53°.

Herein, the plus symbols line in FIG. 6 represents the observed pattern of the solid electrolyte prepared actually according to the present disclosure, and solid line represents the calculated pattern of the solid electrolyte according to the present disclosure calculated theoretically. Meanwhile, the dashed line represents the difference pattern between the two patterns. In addition, the rectangular dots are input values for calculating the theoretical values of the solid electrolyte according to the present disclosure, and the elliptical dots are input values of impurities for correction.

Determination and Analysis of Crystal Structure

To determine the crystal structure of the solid electrolyte according to the present disclosure, all of the peaks obtained from the crystal structure analysis were subjected to LeBail fitting by using the program of GSAS (A. C. Larson and R. B. Von Dreele, "General Structure Analysis System," Report no. LAUR086-748, Los Alamos National Laboratory, Los Alamos, N.M. 87545) to obtain a structure factor, and then subjected to the crystal structure solution of a single crystal based on CRYSTALS (D. J. Watkin, C. K. Prout, J. R. Carruthers, P. W. Betteridge, CRYSTALS, Issue 10; Chemical1Crystallography Laboratory, University of Oxford: Oxford, U.K. 1996). In this manner, the crystal structure was analyzed. The crystallographic data of the structure model are shown in the following Table 2.

TABLE 2

| Atom | Site | x | y | z | Occupancy | $U_{iso} \times 100$ |
|---|---|---|---|---|---|---|
| Li1 | 2c | 0.3333 | 0.6667 | 0 | 0.625 | 1.9 (9) |
| Li2 | 2d | 0.3333 | 0.6667 | 0.5 | 0.625 | 1.9 (9) |
| Zn | 2d | 0.3333 | 0.6667 | 0.5 | 0.375 | 1.9 (9) |
| P | 2e | 0 | 0 | 0.3273 (9) | 1.00 | 1.9 (9) |
| S | 6k | 0.3301 (3) | 0 | 0.2565 (1) | 1.00 | 1.9 (9) |

Figure 8:
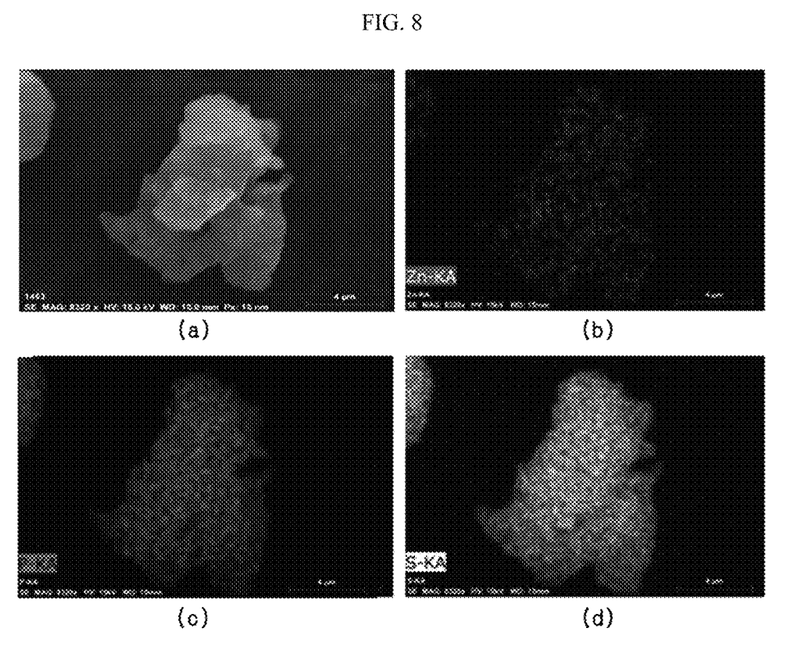
FIG. 8 is a scanning electron microscopic (SEM) image of the solid electrolyte according to Preparation Example 2.

Particularly, referring to the SEM image of Preparation Example 2 as shown in FIG. 8, it can be seen from the zinc element distribution image of FIG. 8(*b*), phosphorus element distribution image of FIG. 8(*c*) and the sulfur element distribution image of FIG. 8(*d*) that zinc, phosphorus and sulfur elements are distributed homogeneously in the solid electrolyte.

On the contrary, $L_4P_2S_6$ shows the crystallographic data as shown in the following Table 3.

TABLE 3

| Atom | Site | x | y | z | Occupancy | $U_{iso} \times 100$ |
|---|---|---|---|---|---|---|
| Li1 | 2c | 0.3333 | 0.6667 | 0 | 1 | 3.8 |
| Li2 | 2d | 0.6667 | 0.3333 | 0.5 | 1 | 3.8 |
| P1 | 2e | 0 | 0 | 0.165 (3) | 0.56 | 0.85 (18) |
| P2 | 2e | 0 | 0 | 0.681 (3) | 0.44 | 0.85 (18) |
| S | 6k | 0.3225 (4) | 0 | 0.2477 (12) | 1.00 | 1.39 (8) |

It can be seen from the above results that $L_4P_2S_6$ and the sulfide-based solid electrolyte according to the present disclosure have significantly different crystallographic data, even though they have the same crystal structure, and thus the sulfide-based solid electrolyte according to the present disclosure is a novel compound.

DESCRIPTION OF DRAWING NUMERALS

10: Positive electrode
20: Negative electrode
30: Solid electrolyte
40: Polyetherether ketone column
51: Lithium element
52: Sulfur element
53: Phosphorus element
54: Zinc element

What is claimed is:

1. A sulfide-based solid electrolyte comprising a compound represented by the following Chemical Formula 1 or Chemical Formula 2:

$Li_xZn_yP_zS_6$      [Chemical Formula 1]

wherein 1≤x≤4, 0<y≤2, and 0<z≤3;

$Li_{2+2k}Zn_{1-k}P_2S_6$      [Chemical Formula 2]

wherein 0≤k<1;

wherein the compound has a crystal structure satisfying the following conditions (a)-(c):
(a) a space group that belongs to P31m (No. 162);
(b) unit cell parameters of a=6.03±0.5 Å and c=6.59±0.5 Å; and
(c) crystallographic coordinates of cations occupying 2c, 2d and 2e coordinates in a unit cell with a site occupancy of each coordinate of larger than 0 and equal to or less than 1, and a crystallographic coordinate of anions occupying 6k coordinate in a unit cell with a site occupancy of 6k of larger than 0 and equal to or less than 1, wherein each of the coordinates represents the following:
2c (⅓, ⅔, 0);
2d (⅓, ⅔, ½);
2e (0, 0, z), wherein 0.30≤z≤0.33; and
6k (x, 0, z), wherein 0.325≤x≤0.35 and 0.23≤z≤0.28.

2. The sulfide-based solid electrolyte according to claim 1, which comprises a compound represented by the following Chemical Formula 1:

$Li_xZn_yP_zS_6$      [Chemical Formula 1]

wherein 1≤x≤4, 0<y≤2, and 0<z≤3.

3. The sulfide-based solid electrolyte according to claim 1, which comprises a compound represented by the following Chemical Formula 2:

$Li_{2+2k}Zn_{1-k}P_2S_6$      [Chemical Formula 2]

wherein 0≤k<1.

4. The sulfide-based solid electrolyte according to claim 1, which shows peaks at the following positions, as analyzed by powder X-ray diffractometry (XRD) using Cu-Kα rays with an X-ray wavelength of 1.5406 Å and 1.5444 Å:
12-14° 2θ;
16-18° 2θ;
25-26° 2θ;
30-33° 2θ;
39-41° 2θ; and
50-53° 2θ.

5. The sulfide-based solid electrolyte according to claim 1, wherein each of the coordinates represents the following:
2c (⅓, ⅔, 0);
2e (0, 0, 0.3273); and
6k (0.3301, 0, 0.2565).

6. The sulfide-based solid electrolyte according to claim 1, which has an average particle diameter ($D_{50}$) of 1-20 μm.

7. The sulfide-based solid electrolyte according to claim 1, wherein k is 0-0.75, and the sulfide-based solid electrolyte has an ion conductivity of $1\times10_{-6}$ to $15\times10_{-6}$ S/cm.

8. A method for preparing a sulfide-based solid electrolyte according to claim 1, comprising:
(S1) mixing lithium sulfide ($Li_2S$), zinc sulfide (ZnS), a phosphorus (P) compound and a sulfur(S) compound to obtain a mixture; and
(S2) heat treating the mixture to obtain a crystalline or vitreous solid electrolyte comprising a compound represented by the following Chemical Formula 1 or Chemical Formula 2:

$Li_xZn_yP_zS_6$      [Chemical Formula 1]

wherein 1≤x≤4, 0<y≤2, and 0<z≤3;

$Li_{2+2k}Zn_{1-k}P_2S_6$      [Chemical Formula 2]

wherein 0≤k<1.

9. The method for preparing a sulfide-based solid electrolyte according to claim 8, wherein lithium sulfide and zinc sulfide are used at a molar ratio of 2+2k: 1−k wherein 0≤k<1.

10. The method for preparing a sulfide-based solid electrolyte according to claim 9, wherein k is 0-0.75, and the sulfide-based solid electrolyte has an ion conductivity of $1\times10^{-6}$ to $15\times10^{-6}$ S/cm.

11. The method for preparing a sulfide-based solid electrolyte according to claim 8, which further comprises a step of pelletizing the mixture between step (S1) and step (S2).

12. The method for preparing a sulfide-based electrolyte according to claim 8, which is carried out under vacuum or under inert gas atmosphere.

13. An all-solid-state battery comprising: a positive electrode; a negative electrode; and an electrolyte layer interposed between the positive electrode and the negative electrode, wherein at least one of the positive electrode, the negative electrode and the electrolyte layer includes the sulfide-based solid electrolyte as defined in claim 1.

* * * * *